United States Patent
Hawker et al.

[11] Patent Number: 6,144,738
[45] Date of Patent: Nov. 7, 2000

[54] TELEPHONE HANDSET WITH ENHANCED HANDSET/HANDSFREE RECEIVING AND ALERTING AUDIO QUALITY

[75] Inventors: Larry E. Hawker; Walter Dolezal, both of Nepean, Canada

[73] Assignee: Nortel Networks Corporation, Montreal, Canada

[21] Appl. No.: 09/158,818

[22] Filed: Sep. 23, 1998

Related U.S. Application Data

[63] Continuation of application No. 08/851,036, May 5, 1997, abandoned.

[51] Int. Cl.[7] .................................................. H04M 1/00
[52] U.S. Cl. ............................................................. 379/433
[58] Field of Search ................................. 379/433, 420, 379/428; 381/309, 373, 300, 345–348, 386

[56] References Cited

U.S. PATENT DOCUMENTS

| | | | |
|---|---|---|---|
| 4,418,248 | 11/1983 | Mathis | 381/373 |
| 4,907,266 | 3/1990 | Chen | 379/433 |
| 5,333,206 | 7/1994 | Koss | 381/309 |
| 5,642,402 | 6/1997 | Vilmi et al. | 379/420 |
| 5,790,679 | 8/1998 | Hawker et al. | 379/433 |

FOREIGN PATENT DOCUMENTS

| | | | |
|---|---|---|---|
| 63-149951 | 6/1988 | Japan | 379/433 |

*Primary Examiner*—Jack Chiang
*Attorney, Agent, or Firm*—Pascal & Associates

[57] ABSTRACT

A handset comprising a sealed unit receiver and a loudspeaker, first apparatus for providing sound from the receiver to the ear of a user when the ear of the user is sealed to the handset, and second apparatus for providing sound from both the receiver and from the loudspeaker to the ear of the user when the ear of the user is only partly sealed to the handset.

8 Claims, 3 Drawing Sheets

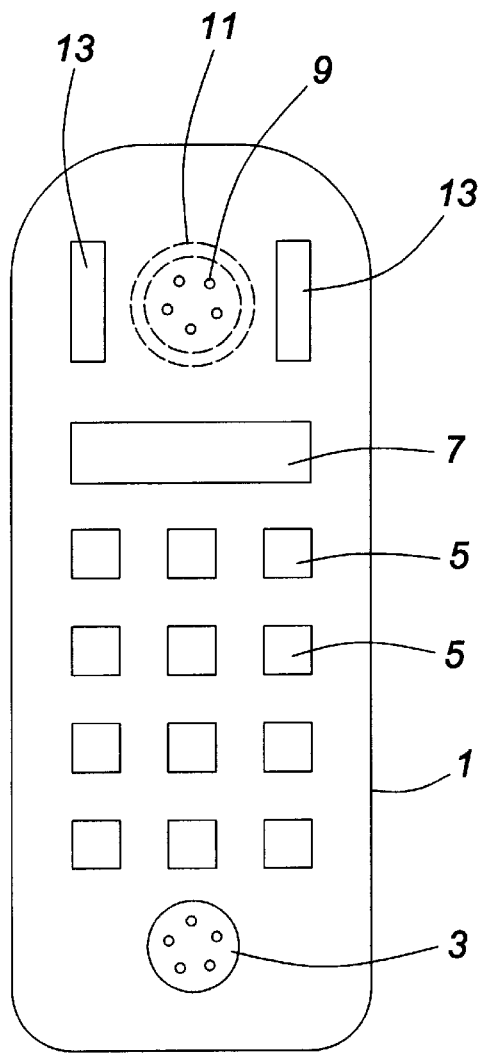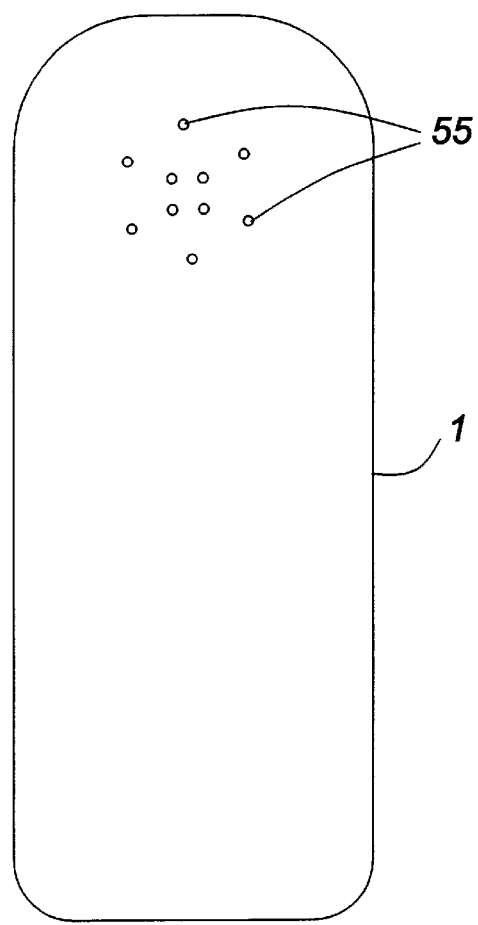
FIG. 1  FIG. 4

6,144,738

TELEPHONE HANDSET WITH ENHANCED HANDSET/HANDSFREE RECEIVING AND ALERTING AUDIO QUALITY

This application is a continuation of U.S. Ser. No. 08/851,036 filed on May 5, 1997 now abandoned.

FIELD OF THE INVENTION

This invention relates to a telephone handset, and in particular to a handset which provides both handset and loudspeaking capabilities as may be used in wireless applications.

BACKGROUND TO THE INVENTION

Some telephone handsets are used in a so-called handset mode, wherein they are placed close to the face of a user with the receiver portion placed against an ear, and in a loudspeaking mode, wherein they are located a distance from the face of the user. Loudspeaking mode is often used in applications requiring that the handset be held in one hand and dialed, while the user listens to voice responses, where there is a display on the handset, etc.

In order to provide a loudspeaking mode, handsets have typically used two transducers facing opposite directions (i.e. with a receiver facing the front and a loudspeaker facing the rear of the handset), or facing the same direction (i.e. the front of the handset) but located at the top and bottom of the handset.

In the first case, the loudspeaking audio quality can be compromised due to audio diffraction around the handset. To obtain optimal audio quality the user must rotate the handset so that the loudspeaker faces the user, which places the dialing keys and display (if one were used) in an inconvenient position. Further, while the receiver provides reasonable audio quality when used in the handset mode when the handset is sealed around the ear of the user, it provides relatively poor audio quality (losing low frequencies) if it is not sealed around the ear of the user, for example if the user is wearing earrings.

In the second case, separate microphones must be used for the handset and loudspeaking modes, to maintain acoustic stability, which incurs cost. This solution also suffers from loss of low frequencies in the case that the handset is not sealed to the ear of the user, in the handset mode.

SUMMARY OF THE INVENTION

The present invention is a structure that in one embodiment provides both handset and loudspeaking sound from the front of the handset, avoiding the requirement that the user rotate the handset to obtain good quality audio in the loudspeaking mode, provides good quality sound in the handset mode whether the user has the handset sealed or not sealed to the ear, and avoids the requirement for use of two microphones.

In the present invention, when the handset is used in the handset mode with the ear of the user sealed around the receiver, the good quality sound is provided by the receiver. When used in the loudspeaking mode, a loudspeaker, which in one embodiment faces the front of the handset, provides the sound, avoiding diffraction around the handset. When used in the handset mode with the ear of the user not sealed around the receiver, thus reducing the acoustic amplitude at low frequencies, the loudspeaker provides the low frequencies to the ear of the user through the front of the handset, thus filling in the frequency response, and providing good quality sound to the user.

The receiver and loudspeaker are contained in adjoining cavities, the sound from the loudspeaker passing through at least one port in the front of the front cavity, outside the region where the ear of the user is to be sealed to the handset, the sound from the receiver passing through at least one port within the region where the ear of the user is to be sealed to the handset.

In another embodiment, only a single cavity is used, with the loudspeaker sound passing through ports at the rear of the cavity and thus of the handset. However, the rear of the loudspeaker is ported to the cavity, and the sound from the loudspeaker passes through at least one port in the front of the cavity, outside the region where the ear of the user is to be sealed to the handset, the sound from the receiver passing through at least one port within the region where the ear of the user is to be sealed to the handset. In this embodiment the feature of the handset not being required to be rotated is not achieved, but the low frequency enhancement in handset mode when the ear of the user is not sealed to the handset is achieved.

In accordance with an embodiment of the invention, a handset is comprised of a sealed unit receiver and a loudspeaker, first apparatus for providing sound from the receiver to the ear of a user when the ear of the user is sealed to the handset, and second apparatus for providing sound from both the receiver and from the loudspeaker to the ear of the user when the ear of the user is only partly sealed to the handset.

In accordance with another embodiment of the invention, a handset is comprised of at least one acoustic enclosure, the enclosure containing at least one port in a front surface thereof, the at least one port communicating with and being contained within a defined ear-to-handset sealing region of the handset, a sealed unit receiver for emitting sound through the at least one port sealed between the enclosure and the at least one port, a loudspeaker disposed within the enclosure for emitting low frequency sound, and at least one further port in a front surface of the enclosure communicating with and being located outside the sealing region of the handset for emitting the low frequency sound to a user when an ear of the user is not sealed to the handset within said sealing region.

In accordance with another embodiment of the invention, a method of operating a handset is comprised of coupling sound from a receiver to the ear of a user within a defined ear-to-handset sealing region, and coupling low frequency sound from an auxiliary loudspeaker to the ear outside of the sealing region during use of the handset when the ear is not completely sealed to the handset.

BRIEF INTRODUCTION TO THE DRAWINGS

A better understanding of the invention will be obtained by considering the detailed description below, with reference to the following drawings, in which:

FIG. 1 is a front view of a handset in accordance with a first embodiment of the invention, FIG. 2 is a cross-section of a portion of a handset in accordance with the first embodiment of the invention, FIG. 3 is a cross-section of a portion of a handset in accordance with a second embodiment of the invention, and FIG. 4 is a rear view of a handset in accordance with the second embodiment of the invention.

DETAILED DESCRIPTION OF PREFERRED EMBODIMENTS OF THE INVENTION

Figure 2:
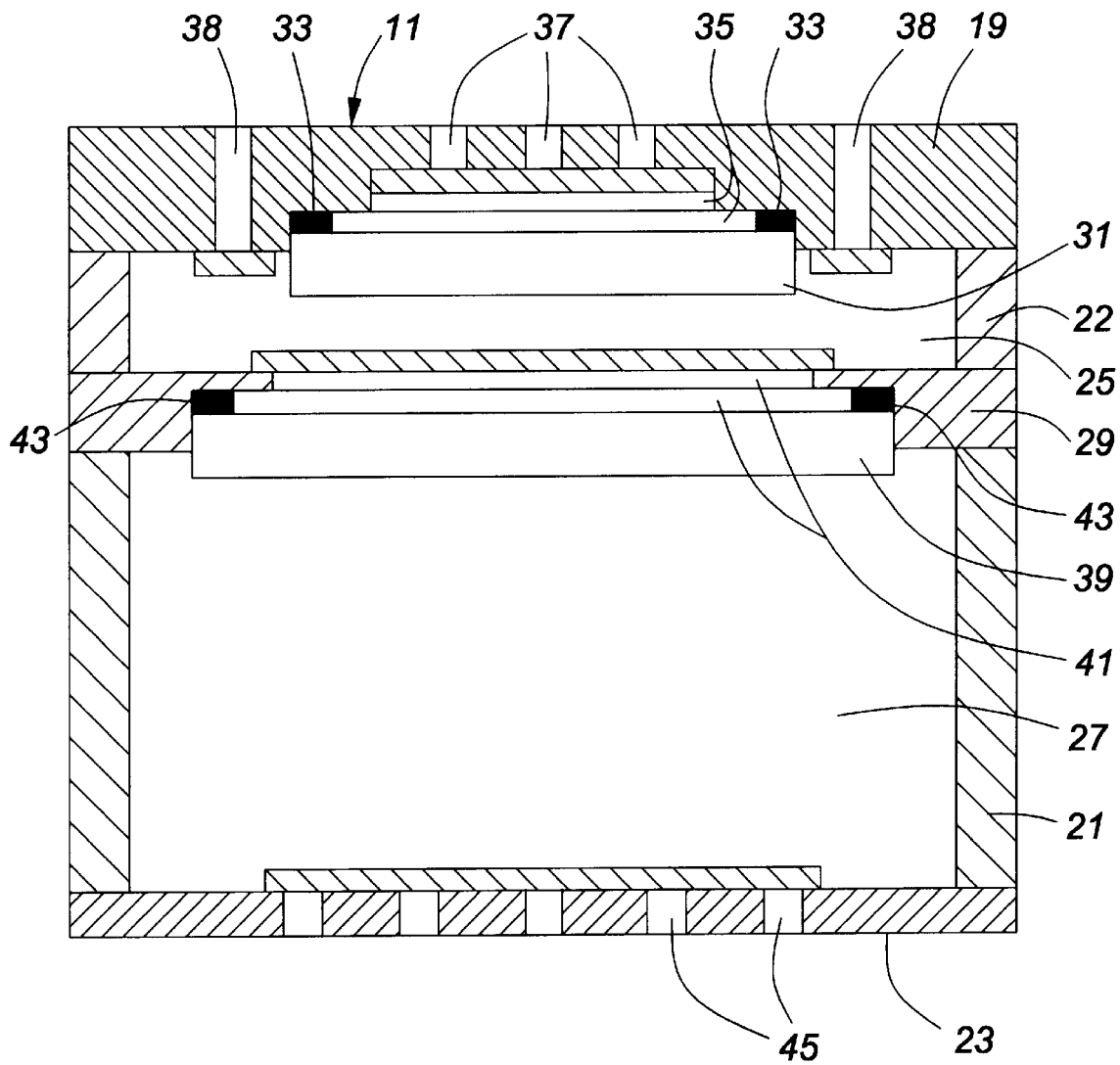

Turning first to FIG. 1, a handset 1 is comprised of a microphone port 3, dialing keys 5, it may include a display 7, and at least one (but typically plural) receiver port 9. As is well known, a microphone is located within the handset behind the microphone port to receive speech from the user, and a receiver is located within the handset behind the receiver port in order to emit sound generated by the receiver.

The handset is typically designed so as to emit optimal frequency and amplitude sound with the ear of the user sealed to the handset, e.g. in the sealing region 11, whereby part of the ear of the user becomes part of the acoustic circuit. As noted earlier, sound having a poor low frequency response is heard by the user if the ear is not completely sealed to the sealing region, for the reason that the lack of the seal destroys the required acoustic circuit.

In accordance with an embodiment of the invention, a loudspeaker (otherwise used in the loudspeaking mode) is contained within the handset in a structure which provides low frequency sound during the handset mode. As part of the structure, ports 13, which are outside the sealing region 11, provide the low frequency sound.

The structure of one embodiment can be seen in FIG. 2. An acoustic enclosure is formed of a front wall 19, side walls (e.g. in cylindrical form) 21 and 22, and a rear wall 23. Wall 22 could be part of either 19 or 21. The enclosure is divided into two acoustically isolated cavities 25 and 27 by a separator wall 29.

A sealed unit handset receiver 31 is sealed facing wall 19 to a concave indentation 35 by an acoustic gasket 33. At least one port 37 passes between the outside front wall 19 of the handset and the concave indentation 35, within the boundaries of the sealing region 11, to allow sound to be emitted from the receiver to the ear of the user.

A port or ports 38 extends through the front wall 19, to cavity 25, and are disposed outside the sealing region 11.

A loudspeaker 39 is sealed to an annular hole 41 in the separator wall 29, by an acoustic gasket 43. The rear of the loudspeaker is ported to the cavity 27. A port or ports 45 may extend through the rear wall 23 to the outside of the cavity 27 to form a ported enclosure to enhance the performance.

Preferably, for acoustic enhancement reasons, a layer of acoustic resistance material covers the inside ends of ports 37, 38 and 45, and the cavities 25 and 27 are filled with acoustic foam to increase the effective acoustic size of those cavities.

In operation, when used in the handset mode, and with the ear of a user sealed in the sealing region 11, sound is heard from the receiver 31, loudspeaker sound passing through ports 38 being attenuated to the ear due to that sound being emitted outside the sealed area of the ear.

When used in the loudspeaking mode, the sound from the loudspeaker passes via cavity 25 through ports 38 to the user, cavity 27 and ports 45 with the acoustic resistance material and acoustic foam in cavity 27 forming an acoustic load on loudspeaker 39.

When used in the handset mode but with the ear of the user not completely sealed in the sealing region, the sound of the receiver will be heard by the user, but due to the poor acoustic circuit caused by the lack of seal, low frequencies will be attenuated. However, due to the lack of seal, sound from the loudspeaker emitted via ports 38 will be heard by the user, filling in and greatly improving the frequency response of the device.

It will be recognized that the device described above (or the device in the embodiment described below) can be formed as a separate unit and fixed within a handset shell (appropriately acoustically sealed to corresponding ports in the shell), or can be formed by moulding the handset into the correct form. The cavity and port dimensions, the densities of the acoustic foam and acoustic gasket and the acoustic permeabilities of the acoustic resistance material can be designed by normal acoustic design techniques to create an appropriate acoustic intensity and frequency response at the ear of the user. The receiver and loudspeaker can be any suitable electroacoustic transducer types. An external structure such as a manually or automatically controlled switch (such as one controlled by a proximity detector) can appropriately change the amplitude and frequency of signals applied to the receiver and loudspeaker, when the device is to be used in either of its two modes.

Figure 3:
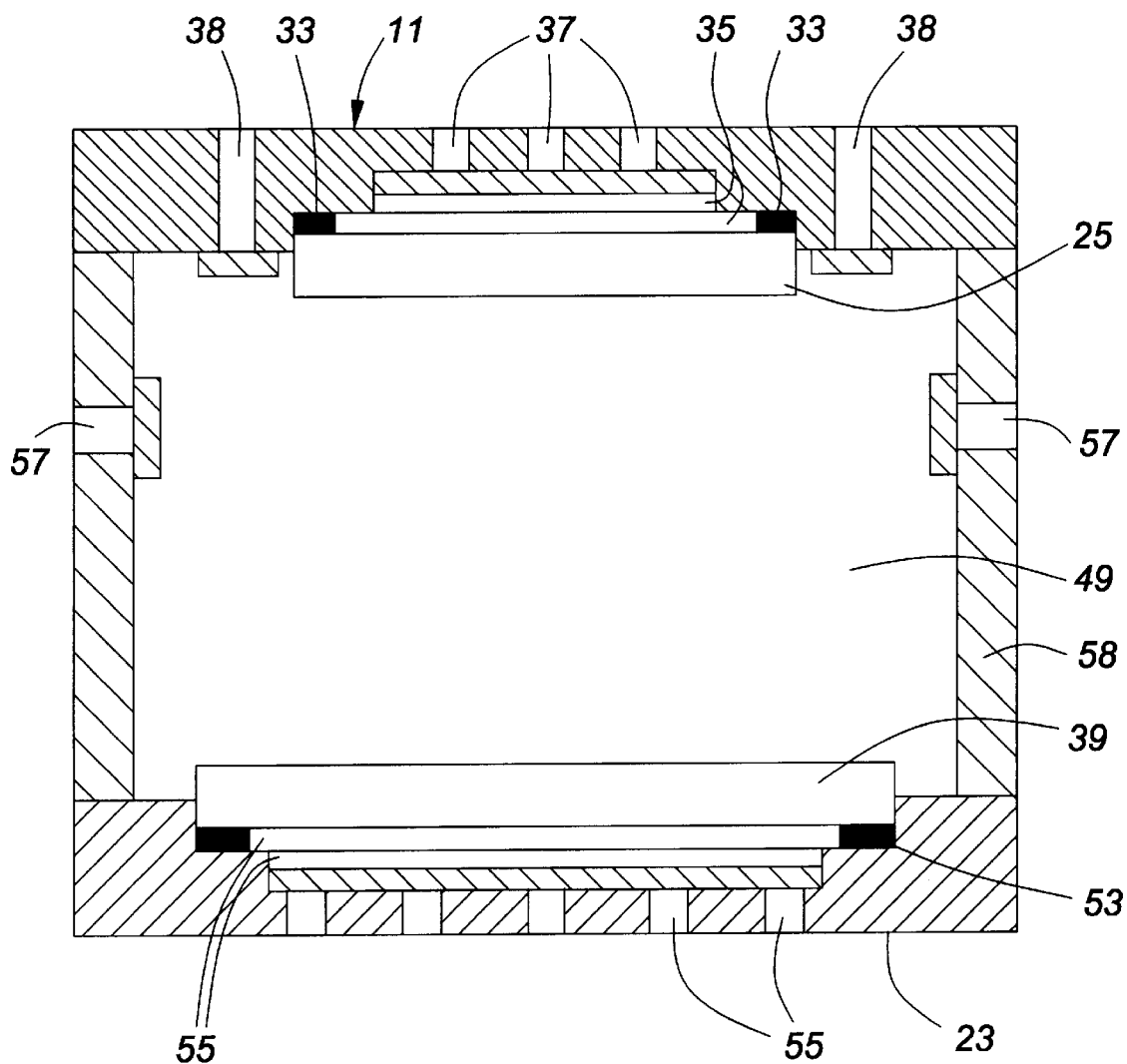

FIG. 3 illustrates the cross-section of a device in accordance with another embodiment. The enclosure is formed similarly to the embodiment of FIG. 2, except that the divider 29 is not used. The result is a single cavity 49. The receiver must be a sealed unit to prevent sound from the loudspeaker from getting through the receiver and then the receiver ports directly to the user's ear. Otherwise very loud levels from the loudspeaker could damage hearing. This also applies to the embodiment described with reference to FIG. 2.

In the present embodiment, the loudspeaker 39 faces and is sealed to a cavity 51 by means of an acoustic gasket 53. A port or ports 55 passes between the cavity 51 and the outside of wall 23. The loudspeaker should be back ported to cavity 49.

For acoustic reasons, it can be useful to provide ports 57 in the side walls 58, which usefully can be adjacent or at the junction of a pair of clamshell moulded parts forming the handset.

As in the previously described embodiment, it is preferred to provide acoustic resistance material at the inner ends of ports 37, 38, 55 and 57, and to fill the cavity 49 with acoustic foam.

In operation, in the loudspeaking mode, sound from the loudspeaker passes through ports 55. As noted above, the user may wish to reverse the position of the handset, so that ports 55 are facing the user, as shown in FIG. 4.

Sound from the rear of the loudspeaker passes via cavity 49 through ports 38. Thus when used in the handset mode, the device operates as in the first embodiment, with only sound from the receiver passing to the ear of the user when the ear is sealed to in sealing zone 11, and with sound from both the receiver and loudspeaker passing to the ear of the user when the ear is not sealed to in sealing zone 11.

In the embodiments described above the receiver and loudspeaker can be disposed coaxially, or they can be disposed in the described cavities in some other convenient position. It is important, however, to port sound from the loudspeaker to increase the reduced amplitude of the sound heard by the user, to the ear of the user, when in the handset mode and the ear is not sealed in sealing zone 11.

The resulting devices provide significantly improved sound reproduction from a handset such as one that is to be used in a wireless application. Further, separate microphones for the various modes are not required since the transducers for both modes are contained in the same enclosure.

A person understanding this invention may now conceive of alternative structures and embodiments or variations of the above. All those which fall within the scope of the claims appended hereto are considered to be part of the present invention.

We claim:

1. A handset comprising a sealed-unit receiver and a loudspeaker, first means for providing sound from substantially only the sealed unit receiver to the ear of a user when the ear of the user is sealed to the handset, said first means comprising at least one port coupling sound from the receiver within a region of a surface of the handset intended to be in sealing contact with the ear of a user, and second means for providing sound from both the sealed unit receiver and from said loudspeaker to the ear of the user when the ear of the user is not sealed to the handset, said second means comprising at least one further port coupling sound from the loudspeaker to the ear of the user outside of said region, and in which the receiver and loudspeaker are sealed to walls of an acoustic cavity of the handset, both receiver and loudspeaker being back-ported to said acoustic cavity, said at least one further port communicates with said acoustic cavity.

2. A handset comprising a sealed unit receiver and a loudspeaker, first means for providing sound from substantially only the sealed unit receiver to the ear of a user when the ear of the user is sealed to the handset, and second means for providing sound from both the sealed unit receiver and from said loudspeaker to the ear of the user when the ear of the user is not sealed to the handset, in which the first means is comprised of at least one port coupling sound from the receiver within a region of a surface of the handset intended to be in sealing contact with the ear of a user, and in which the second means is comprised of at least one further port coupling sound from the loudspeaker to the ear of the user outside of said region, in which the handset is comprised of first and second acoustic cavities, said sealed unit receiver being sealed to a wall of, and back-ported to, the first acoustic cavity, a front of the loudspeaker forming a seal to the first acoustic cavity between the first acoustic cavity and said second acoustic cavity which is larger than the first acoustic cavity, a back of the loudspeaker being back-ported to the second acoustic cavity, said at least one further port communicating with said first acoustic cavity, and at least one additional port coupling said second acoustic cavity to a rear of the handset.

3. A handset as defined in claim 1 in which the receiver and loudspeaker are coaxial.

4. A handset as defined in claim 2 in which the receiver and loudspeaker are coaxial.

5. A handset comprising a sealed unit receiver and a loudspeaker, a first coupling structure comprising at least one port coupling sound from the receiver within a region of a surface of the handset intended to be in sealing contact with the ear of a user, for providing sound from substantially only said sealed unit receiver to the ear of a user when the ear of the user is sealed to the handset, and a second coupling structure comprised of at least one further port coupling sound from the loudspeaker to the ear of the user outside of said region, and for providing sound from both the sealed unit receiver and from said loudspeaker to the ear of the user when the ear of the user is not sealed to the handset, and in which the receiver and loudspeaker are sealed to walls of an acoustic cavity of the handset, both receiver and loudspeaker being back-ported to said acoustic cavity, said at least one further port communicates with said acoustic cavity.

6. A handset comprising a sealed unit receiver and a loudspeaker, a first coupling structure for providing sound from substantially only said sealed unit receiver to the ear of a user when the ear of the user is sealed to the handset, and a second coupling structure for providing sound from both the sealed unit receiver and from said loudspeaker to the ear of the user when the ear of the user is not sealed to the handset, in which the first coupling structure is comprised of at least one port coupling sound from the receiver within a region of a surface of the handset, intended to be in sealing contact with the ear of a user, and in which the second coupling structure is comprised of at least one further port coupling sound from the loudspeaker to the ear of the user outside of said region, and in which the handset is comprised of first and second acoustic cavities, the receiver being sealed to a wall of, and is back-ported to, the first acoustic cavity, a front of the loudspeaker forming a seal to the first acoustic cavity between the first acoustic cavity and said second acoustic cavity which is larger than the first acoustic cavity, a back of the loudspeaker being back-ported to the second acoustic cavity, the at least one further port communicating with the first acoustic cavity, and at least one additional port coupling the second acoustic cavity to a rear of the handset.

7. A handset as defined in claim 5 in which the receiver and loudspeaker are coaxial.

8. A handset as defined in claim 6 in which the receiver and loudspeaker are coaxial.

* * * * *